United States Patent
Decoux et al.

(10) Patent No.: US 12,219,067 B2
(45) Date of Patent: Feb. 4, 2025

(54) DIGITAL FILE ANTI-FORGERY PROTECTION

(71) Applicant: SICPA HOLDING SA, Prilly (CH)

(72) Inventors: Eric Decoux, Vevey (CH); Philippe Gillet, Pully (CH); Philippe Thevoz, Penthalaz (CH); Elisabeth Wallace, Pully (CH)

(73) Assignee: SICPA HOLDING SA, Prilly (CH)

( * ) Notice: Subject to any disclaimer, the term of this patent is extended or adjusted under 35 U.S.C. 154(b) by 763 days.

(21) Appl. No.: 17/253,490

(22) PCT Filed: Jun. 3, 2019

(86) PCT No.: PCT/EP2019/064376
§ 371 (c)(1),
(2) Date: Dec. 17, 2020

(87) PCT Pub. No.: WO2019/243034
PCT Pub. Date: Dec. 26, 2019

(65) Prior Publication Data
US 2021/0203508 A1    Jul. 1, 2021

(30) Foreign Application Priority Data
Jun. 19, 2018   (EP) .................................... 18178628

(51) Int. Cl.
*H04L 9/00* (2022.01)
*G06F 16/9035* (2019.01)
(Continued)

(52) U.S. Cl.
CPC ........ *H04L 9/3236* (2013.01); *G06F 16/9035* (2019.01); *G06F 16/9038* (2019.01);
(Continued)

(58) Field of Classification Search
CPC ................. H04L 9/3236; H04L 9/0643; H04L 9/3247; H04L 9/50; G06F 16/9035; G06F 16/9038; G06F 21/16; G06F 21/64
See application file for complete search history.

(56) References Cited

U.S. PATENT DOCUMENTS

| 4,459,663 A | 7/1984 | Dye |
| 7,152,047 B1 | 12/2006 | Nagel |

(Continued)

FOREIGN PATENT DOCUMENTS

| CN | 1441935 | 9/2003 |
| CN | 1983165 | 6/2007 |

(Continued)

OTHER PUBLICATIONS

Ahto Buldas et. al.: "Efficient Record-Level Keyless Signatures for Audit Logs", International Association for Cryptologic Research, vol. 20140718:122633, pp. 1-13, Jul. 15, 2014, XP061016649.

(Continued)

*Primary Examiner* — Kevin Ayala
(74) *Attorney, Agent, or Firm* — Muncy, Geissler, Olds and Lowe, P.C.

(57) ABSTRACT

The invention relates to securing of a digital file content against forgery and falsifying, and particularly of digital data relating to its belonging to a specific batch of digital files, while allowing offline or online checking of the authenticity of a secured digital file and conformity of its digital data with respect to that of a genuine original digital file.

14 Claims, 4 Drawing Sheets

(51) Int. Cl.
 *G06F 16/9038* (2019.01)
 *H04L 9/06* (2006.01)
 *H04L 9/32* (2006.01)

(52) U.S. Cl.
 CPC .......... *H04L 9/0643* (2013.01); *H04L 9/3247* (2013.01); *H04L 9/50* (2022.05)

(56) References Cited

U.S. PATENT DOCUMENTS

| | | | |
|---|---|---|---|
| 8,554,809 | B1 | 10/2013 | Zhou et al. |
| 2005/0036651 | A1 | 2/2005 | Wen |
| 2005/0071631 | A1 | 3/2005 | Langer |
| 2007/0130447 | A1 | 6/2007 | Coon et al. |
| 2009/0222668 | A1 | 9/2009 | Zaccone et al. |
| 2009/0265558 | A1* | 10/2009 | Izu ................. H04L 9/3247 713/176 |
| 2010/0169653 | A1* | 7/2010 | Takenaka ........ H04L 9/3247 713/176 |
| 2010/0185867 | A1* | 7/2010 | Izu ................. H04L 9/3247 713/176 |
| 2012/0125997 | A1* | 5/2012 | Burra ............... G06K 19/10 235/494 |
| 2013/0067180 | A1* | 3/2013 | Leet ................. G06F 16/113 711/161 |
| 2015/0143136 | A1* | 5/2015 | Barney ............ H04L 9/3242 713/193 |
| 2016/0162691 | A1* | 6/2016 | Arnold ............ H04L 9/3239 726/26 |
| 2017/0236121 | A1* | 8/2017 | Lyons ............. G06Q 20/3829 705/71 |

FOREIGN PATENT DOCUMENTS

| | | |
|---|---|---|
| DE | 9313716 | 1/1994 |
| JP | 2005341253 | 12/2005 |

OTHER PUBLICATIONS

S. Goldwasser and M. Bellare "Lecture Notes on Cryptography", MIT, Jul. 2008, 289 pages.
Benaloh J. et al.: "One-Way Accumulators: A Decentralized Alternative to Digital Signatures (Extended Abstract)", Electronic Publishing, Artistic Imaging, and Digital Typogr; [Lecture Notes in Computer Science, ISSN 0302-9743], Springer Verlag, DE, vol. 765, May 23, 1993, pp. 274-285, XP008066935, ISBN: 978-3-540-24128-7.
International Search Report and Written Opinion of the ISA with respect to application No. PCT/EP2019/064376.
Japan Patent Office Action in counterpart Japanese Application No. JP 2020-569951 dated May 16, 2023 (and English language translation of Office Action).
China Patent Office Action in counterpart Chinese Application No. CN 201980041860 dated Sep. 27, 2023 (and English language translation of Office Action).

* cited by examiner

AC-ID : A125

- 330a Aircraft : HB-SNO
- 330b Aircraft Manuf. : AeroABC
- 330c Component :
- Turbine Blade 1st Ring
- 330d Serial Number : 12781
- 330e Part Manufacturer : PCX
- 330f Manuf. date : Nov 13, 2017
- 330g Assembl. date : Feb 24, 2018
- 330h Checker : Martin White
- 330i Conformity check date :
- Mar 20, 2018
- 330j Checker digital Sig : 2w9so2u

DIGITAL FILE ANTI-FORGERY PROTECTION

TECHNICAL FIELD

The present invention relates to the technical field of protection of digital data against forgery or tampering, and traceability of digital files.

BACKGROUND ART

The problems of counterfeiting and tampering digital files are well known, serious, and growing. The example of falsifying data marked on an original digital document such as a digital identity document or a digital version of a diploma is well known, and the concern is even worse if considering a digital copy of the original (possibly genuine) digital document. Simply keeping track of identifiers such as serial numbers, or even including some digital watermarks, is in general an insufficient response, because counterfeiters can easily copy such numbers or digital watermarks as well.

Ahto Buldas et al: "Efficient Record-Level Keyless Signatures for Audit Logs", International Association for Cryptologic Research, vol. 20140718:122633, pages 1-13, Jul. 15, 2014, discloses a log signing scheme that enables verification of the integrity of the whole log, and presentation of any record, along with a compact proof that the record has not been altered since the log was signed, the log being an ordered sequence of blocks, where each block in turn is an ordered sequence of records.

US 2012/125,997 A1 discloses an approach that leverages public key infrastructure (PKI) digital signature and barcode technology in providing a passport that can be validated for authenticity and data integrity when in printed form. There is a barcoding tool that includes a data retrieving component; a data concatenating component; a digital signature generating component; and a barcode generating component. Also, there is a barcode reading tool that includes reading the identity data and digital signature barcode symbols using a barcode reader; displaying the identity data and digital signature on a display device; verifying the digital signature; and displaying verification results on a display device. One other drawback of most conventional methods for insuring the authenticity of digital files, or securing their digital data, is that they tend to view files in isolation, even if they are members of a well-defined group such as a batch of digital documents for example. This ignores valuable authenticating information.

It is therefore an object of the invention to secure a digital file against forgery and falsifying of its associated data, and particularly of data relating to its belonging to a specific batch of digital files. It is also an object of the invention to allow offline checking of the authenticity of a digital file secured according to the invention and conformity of its digital data content with respect to that of a genuine digital file.

SUMMARY OF THE INVENTION

One aspect of the invention relates to a method of securing a given original digital file of a batch of a plurality of original digital files against forgery or tampering, each original digital file of the batch containing its own digital data, characterized by comprising the steps of:
  for each original digital file of the batch, calculating by means of a one-way function an associated digital file signature of its digital data;
  calculating a reference aggregated digital signature corresponding to the batch of original digital files from all the digital file signatures of the original digital files of the batch by means of a one-way accumulator of said digital file signatures, and making available to a user the reference aggregated digital signature;
  determining a digital file verification key corresponding to the digital file signature of said given original digital file by means of a partial one-way accumulator of the other digital file signatures used for calculating the reference aggregated digital signature, whereby a candidate digital file signature corresponds to that of an original digital file of the batch only if the reference aggregated digital signature is retrieved from the one-way function of said candidate digital file signature and corresponding digital file verification key; and
  including in the given original digital file a corresponding machine readable digital security marking containing a representation of its digital data and its corresponding digital file verification key,
thereby obtaining a marked original digital file of which digital data are secured against forgery or tampering.

The reference aggregated digital signature associated with the batch of original digital files may either be published in a media accessible to the user, or stored in a searchable aggregated signature database accessible to the user, or stored in a blockchain, or in a database secured by a blockchain, accessible to the user.

The marked original digital file further may include aggregated signature access data containing information sufficient to access to the reference aggregated digital signature corresponding to the batch of original digital files, said information being a link to an aggregated signature acquisition interface of, respectively, one of the following:
  the media wherein the reference aggregated digital signature is published, the media being accessible to the user via said aggregated signature acquisition interface operable to receive from the user an aggregated signature request containing digital data, or a digital signature of said digital data, obtained from a digital security marking of a marked original digital file, and send back a reference aggregated digital signature of associated batch;
  the searchable aggregated signature database wherein the reference aggregated digital signature is stored, the aggregated signature database being accessible to the user via said aggregated signature acquisition interface operable to receive from the user an aggregated signature request containing digital data, or a digital signature of said digital data, obtained from a digital security marking of a marked original digital file, and send back a reference aggregated digital signature of associated batch;
  the blockchain, respectively the database secured by the blockchain, wherein the time-stamped aggregated digital signature is stored, the blockchain, respectively the database secured by the blockchain, being accessible to the user via said aggregated signature acquisition interface operable to receive from the user an aggregated signature request containing digital data, or a digital signature of said digital data, obtained from a digital security marking of a marked original digital file, and send back a reference aggregated digital signature of associated batch.

According to the invention, a virtual digital file may be counted as belonging to the batch of original digital files, said virtual digital file having corresponding virtual digital data, and an associated virtual digital file signature obtained by means of the one-way function of its virtual digital data, said virtual digital file being not real but only used for generating the associated virtual digital file signature from the corresponding virtual digital data; and the reference aggregated digital signature associated with said batch of original digital files being calculated from all the digital file signatures of the original digital files of the batch, including the virtual digital file signature, by means of the one-way accumulator.

The one-way function may be a hash function and a digital file signature of an original digital file may be a sequence of a given plurality of bits of lower weights selected from the bits of a hash value of the corresponding digital data.

In the above method, additional digital data corresponding to the digital data associated with the marked original digital file may be stored in a searchable information database accessible to the user via an information database interface operable to receive from the user an information request containing digital data, or corresponding digital file signature data, obtained from a digital security marking of a marked original digital file, and send back corresponding additional digital data.

Moreover, the digital data of the marked original digital file may include reference characteristic digital data CDD of a corresponding unique physical characteristic of an associated object or individual.

Another aspect of the invention relates to a method of verifying the authenticity of a digital file secured according to the above method, or the conformity of a copy of such secured digital file with respect to the original one, comprising the steps of, upon processing a test file being said digital file or said copy of the digital file by means of a processing unit connected to a memory:

having stored in the memory the test file;

reading a representation of digital data and of a test file verification key on a digital security marking in the stored test file, and extracting respectively corresponding digital data and test file verification key from said read representation;

having stored in the memory a reference aggregated digital signature of a corresponding batch of digital files, and having programmed in the processing unit the one-way function and the one-way accumulator;

verifying that the extracted digital data and test file verification key indeed correspond to the stored reference aggregated digital signature by performing the steps of:

calculating a digital signature of the extracted digital data with the one-way function;

calculating a candidate aggregated digital signature from the calculated digital signature of the extracted digital data and the extracted test file verification key with the one-way accumulator; and checking that the obtained candidate aggregated digital signature matches the stored reference aggregated digital signature, whereby, in case said aggregated digital signatures match, the digital data of the test file are that of a genuine original digital file.

The verification method, wherein the digital file is secured by storing the reference aggregated digital signature associated with batch of original digital files in a searchable aggregated signature database accessible to the user, and wherein the processing unit is further connected to a communication unit operable to send and receive back data via a communication link, may comprise the preliminary steps of:

sending with the communication unit via the communication link a request to said aggregated signature database, and receiving back the reference aggregated digital signature associated with batch of original digital files; and storing the received aggregated digital signature in the memory.

In said verification method, wherein the marked original digital file further includes aggregated signature access data containing information sufficient to access to the reference aggregated digital signature corresponding to the batch of original digital files, said information being a link to an aggregated signature acquisition interface, and wherein the processing unit is further connected to a communication unit operable to send and receive back data via a communication link, may comprise the preliminary steps of:

reading the aggregated signature access data included in the test file;

sending with the communication unit via the communication link an aggregated signature request to said aggregated signature acquisition interface containing the digital data, or a digital signature of said digital data, obtained from the digital security marking in the test file, and receiving back a corresponding reference aggregated digital signature of associated batch; and storing the received aggregated digital signature in the memory.

In the above verification method, the original digital file may be secured with additional digital data stored in a searchable information database accessible to the user via an information database interface as explained above, and the processing unit may further be connected to communication means operable to send to the information database interface an information request containing digital data, or corresponding digital file signature, obtained from the digital security marking in the test file, and receive back corresponding additional digital data.

Moreover, in the above verification method, in case the digital data of the marked original digital file include reference characteristic digital data CDD of a corresponding unique physical characteristic of an associated object or individual, and the processing unit is connected to a sensor operable to detect a unique physical characteristic of an associated object or individual, the processing unit being programmed to extract corresponding unique physical characteristic digital data from a detection signal received from the sensor, the processing unit may further have stored in the memory reference characteristic digital data CDD corresponding to said unique physical characteristic of the associated object or individual, and comprise the further steps of, upon viewing a subject being, respectively, said associated object or individual:

detecting a unique characteristic of the subject and extracting corresponding candidate characteristic digital data $CDD^c$;

comparing the obtained candidate characteristic digital data $CDD^c$ with the stored reference characteristic digital data CDD; and in case the candidate characteristic digital data $CDD^c$ is similar to the stored reference characteristic digital data CDD, within a given tolerance criterion, the subject is considered as genuine.

Another aspect of the invention relates to a marked digital file belonging to a batch of a plurality of original digital files and secured against forgery or tampering according to the above described securing method, wherein each original digital file of the batch has its own digital data, said batch having a corresponding reference aggregated digital signature, the marked digital file comprising a machine readable digital security marking including a representation of its digital data and a corresponding digital file verification key. Moreover, the digital data of the marked digital file may further include reference characteristic digital data CDD of a corresponding unique physical characteristic of an associated object or individual.

According to still another aspect, the invention relates to a system for verifying the authenticity of a marked original digital file secured according to the above mentioned securing method, or the conformity of a copy of such digital file with respect to the original one, comprising a processing unit with a memory, the memory storing a reference aggregated digital signature of a corresponding batch of digital files, and the one-way function and the one-way accumulator being programmed in the processing unit, the system being operable to:

acquire a test file being said digital file or a copy of the digital file and store the acquired test file in the memory;

read a representation of digital data and of a test file verification key on a digital security marking in the stored test file, and extract respectively corresponding digital data and test file verification key from said read representation;

verify that the extracted digital data and test file verification key indeed correspond to the stored reference aggregated digital signature by executing the steps, programmed in the processing unit, of:

calculating a digital signature of the extracted digital data with the one-way function;

calculating a candidate aggregated digital signature from the calculated digital signature of the extracted digital data and the extracted test file verification key with the one-way accumulator; and checking that the obtained candidate aggregated digital signature matches the stored reference aggregated digital signature, whereby, in case said aggregated digital signatures match, the digital data of the test file are that of a genuine original digital file and the system is operable to deliver an indication that the digital data on the test file is that of a genuine original digital file.

Said system for verifying a digital file secured according to the above mentioned securing method, or the conformity of a copy of such digital file with respect to the original one, in case the digital data of the marked original digital file include reference characteristic digital data CDD of a corresponding unique physical characteristic of an associated object or individual, may further be equipped with a sensor connected to the processing unit and operable to detect a unique physical characteristic of an associated object or individual, and the processing unit be programmed to extract corresponding characteristic digital data from a detection signal received from the sensor, the system having stored in the memory reference characteristic digital data CDD corresponding to said unique physical characteristic of the associated object or individual, the system being further operable to:

detect with the sensor a unique physical characteristic of a subject being said associated object or individual, and extract corresponding candidate characteristic digital data $CDD^c$;

compare the obtained candidate characteristic digital data $CDD^c$ with the stored reference characteristic digital data CDD; and in case the candidate characteristic digital data $CDD^c$ is similar to the stored reference characteristic digital data CDD, within a given tolerance criterion, deliver an indication that the subject is considered as genuine.

The present invention will be described more fully hereinafter with reference to the accompanying drawings in which prominent aspects and features of the invention are illustrated.

BRIEF DESCRIPTION OF THE DRAWINGS

FIG. 3 illustrates a batch of components of an aircraft secured according to the invention.

DETAILED DESCRIPTION

Figure 1:
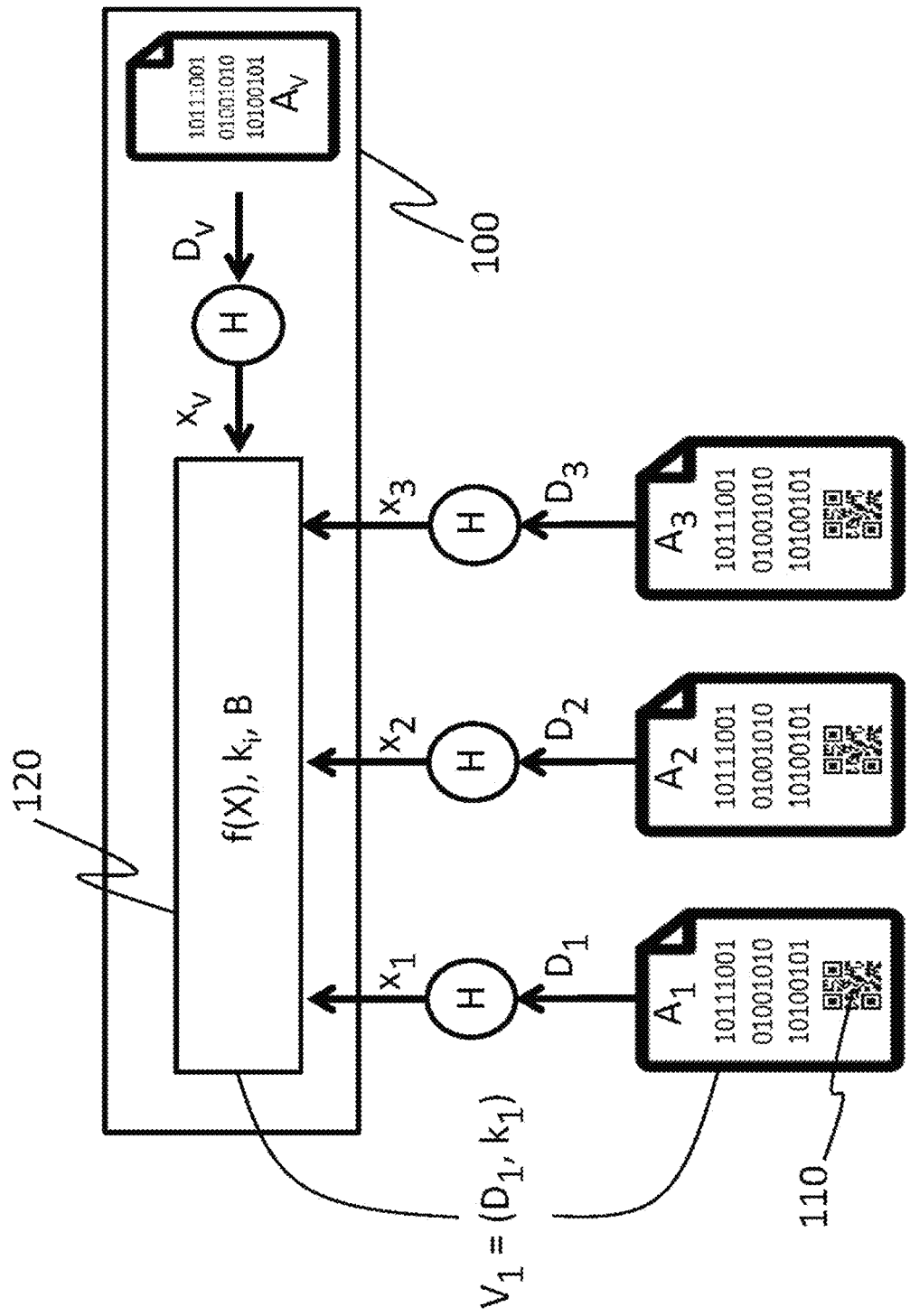
FIG. 1 is a schematic view of a general concept of securing a batch of digital files according to the invention.

The present disclosure is here described in detail with reference to non-limiting embodiments illustrated in the drawings.

FIG. 1 illustrates a general concept of the invention relating to securing a batch of digital files and a method of computing an encoding of verifying information that may be associated with each digital file. FIG. 1 illustrates a group or "batch" of digital files $A_1, A_2, A_3, \ldots$ containing a digital representation of a machine readable security marking 110 (here illustrated by a 2D barcode). In what follows, the expression "digital security marking 110" in fact means "digital representation of a machine readable security marking 110".

A batch of digital files might, for example, relate to a common manufacturing run, items delivered by a particular supplier, items made or shipped during a time period, a set of related images, a group of people, a flock or herd, or any other user-defined grouping of any objects for which digital file $A_i$ (having digital content $D_i$) can be defined. FIG. 1 also shows a "virtual digital file" $A_v$, which is an optional software construct that may be included to enable encoding of selected data. This is explained further below. By way of example only, virtual digital file Ay will be assumed to be included, and will be treated below, as other (real) digital files $A_1, A_2, A_3, \ldots$, since it may be processed substantially in the same way (although it does not correspond to a real file, for example stored in a memory). Of course, a plurality of virtual digital files $A_{v1}, A_{v2}, \ldots, A_{vk}$ can be used for encoding digital data and produce more robust digital signatures (see below).

For each digital file $A_1, A_2, A_3, \ldots A_v$, respective digital data $D_1, D_2, D_3, \ldots, D_v$ are associated or extracted (or, in the case of virtual digital file $A_v$, created) using any appropriate method. This data might be some measure of physical characteristics, textual data such as completed form or product information, a serial number or other identifier, indications of content, a digital representation of an image, or any other information that the system designer chooses to associate with a file. The digital data $D_i$ of a digital file $A_i$ may be extracted from human readable representation of data (e.g. alphanumeric data) by means of a reader capable to produce a corresponding digital data file. Further digital data can be associated with the extracted data to constitute the digital data $D_i$ contained in file $A_i$.

For the virtual digital file $A_v$, the associated digital data $D_v$ may include, for example, a batch identification number, a (pseudo-) random number for the sake of increasing security by increasing data entropy, date and/or time information, etc. One other form of associated digital data might be indications of allowable or non-permissible operations rules, expiration dates, etc. In short, the digital data $D_v$ may be anything that can be represented in digital form.

For each digital file, its respective digital data $D_1$, $D_2$, $D_3$, ..., $D_v$ are preferably transformed mathematically in such a way that they are essentially concealed, although this is not an absolute requirement for any embodiment. This transformation applied to the digital data $D_i$ of a digital file $A_i$ serves to create a corresponding digital signature xi. This digital signature is produced by means of a one-way function (i.e. a function easy to compute but hard to invert, see S. Goldwasser and M. Bellare e "Lecture Notes on Cryptography", MIT, July 2008, www-cse.ucsd.edu/users/mihir). One such advantageous transformation is, for example, applying a hash function H( )=hash( ) to the digital data, which generally has the property that it returns an output of a known bit length regardless of the size of the input: this technical effect is particularly useful for creating a digital signature of digital data associated to a digital file, regardless of the size of the associated digital data and that of the batch of corresponding digital files. The Hash function is a well-known example of a one-way function. If a cryptographic hash function such as the SHA (Secure Hash Algorithm) class of functions, for example, SHA-256, is used, then there are the additional benefits that the function is practically irreversible and collision resistant, that is, the probability is negligible that two different inputs will lead to the same output. As will be understood from the description below, this is also not a requirement of the invention, although it is advantageous for the same reasons as in other applications. As shown in FIG. 1, the values $x_1$, $x_2$, $x_3$, ..., $x_v$ are the hash values, i.e. the associated digital file signatures, of the respective digital data of the digital files, that is, $x_j=H(D_j)$, for j=1, ..., v. Just for the sake of succinctness, X (capital) is used here and in FIG. 1 to indicate the set of hashed data values; thus $X=(x_1, x_2, ..., x_v)$ (if virtual digital file $A_v$ is included; otherwise, the element $x_v$ may be omitted).

In order to shorten the signature, the digital file signature $x_j$ of digital file $A_j$ may even be just a sequence of a given plurality of bits of lower weights selected from the bits of the hash value $H(D_j)$: for example, with the SHA-256 hash function of the SHA-2 family, it suffices to retain only the 128 bits of lower weights from the 256 bits of the signature to still have a robust signature with respect to codebreaking attack.

An aggregated digital signature, or batch value, B is then computed over X by means of a (quasi-commutative) one-way accumulator (see the article of Josh Benaloh and Michael de Mare "One-Way Accumulators: A Decentralized Alternative to Digital Signatures", Advances in Cryptology—Eurocrypt '93, LNCS, vol. 765, pp. 274-285, Springer-Verlag, 1993). In general, for a set of □ signatures $x_1, x_2, ..., x_\mu$ (possibly including digital file signatures of one or more virtual digital files), the corresponding accumulated value $f(x_1, x_2, ..., x_\mu)$, abbreviated as f(X) with $X=(x_1, x_2, ..., x_\mu)$, given by a one-way accumulator f is:

$$f(x_1, x_2, ..., x_\mu) = f(f(f(...f(f(x_1), x_2)...x_3), ..., x_{\mu-2}), x_{\mu-1}), x_\mu).$$

In general, it is possible to write $f(x_1, x_2) = x_1 \otimes x_2$, where $\otimes$ is an associated operator preferably chosen such that f(X) is sufficiently difficult to invert that the computational burden is too high in practical implementations. This concept of computational impracticality as used in embodiments is explained further below. According to the invention, a one-way accumulator is chosen for calculating aggregated signatures in view of the constraint of limiting the size of B. Indeed, such accumulator has the technical effect of producing a digital value of which size (i.e. number of bits) does not depend on the size of its arguments.

As a trivial example, the batch value may be a function f(X) such as the commutative addition modulo a given modulus m, i.e. $f(x)=x \mod m$ and $f(x, y)=x \otimes y$, with the associated commutative operator $\otimes$ defined by $x \otimes y=(x+y) \mod m$. Thus, here we have:

$$f(x,y)=f(x)+f(y) \text{ (i.e. } f(x,y)=f(x) \otimes f(y)).$$

This one-way accumulator has the following commutativity property (although only quasi-commutativity is necessary for the invention):

$$B=f(X)=x_1 \otimes x_2 \otimes x_3 \otimes ... \otimes x_\mu = x_1 \otimes (x_2 \otimes x_3 \otimes ... \otimes x_\mu) = x_2 \otimes x_1 \otimes x_3 \otimes ... \otimes x_\mu), \text{ etc.}$$

Now let $X^i$ be the set of all elements of X except $x_i$. For example, with i=1, $X^1=(x_2, x_3, ..., x_\mu)$. Assuming for simplicity that f(X) is commutative with respect to the elements of X, and given the property of f(X) above, this leads to the following:

$$B=f(X)=x_1 \otimes f(X^1)=f(X^1) \otimes x_1=(x_2 \otimes x_3 \otimes ... \otimes x_\mu) \otimes x_1 = k_1 \otimes x_1$$

with the verification key $k_1=(x_2 \otimes x_3 \otimes ... \otimes x_\mu)=f(X^1)$.

According to the invention, the aggregated digital signature B of the batch of digital files is made immutable, and thus forgery-proof, by being published in a (public) media accessible to a user having to check the authenticity of a digital file (or its associated data), or stored in a searchable aggregated signature database accessible to the user, or, in a preferred mode, stored in a blockchain accessible to the user. The user may then store the value B acquired from these available sources.

For each digital file $A_i$, a corresponding digital file verification key $k_i$ is then computed by means of a partial one-way accumulator of the other digital file signatures $x_j$ (with j≠i), i.e. the one-way accumulator of the digital file signatures $x_1, ..., x_{i-1}, x_{i+1}, ..., x_\mu$ or $f(X^1)$. For example, in the module 120 of FIG. 1, the digital file verification key $k_i$ of digital file $A_i$ is calculated as $k_i=f(X^i)$, and the operation of checking that the digital data $D_i$ and the verification key $k_i$ of digital file $A_i$ indeed correspond to digital data of a genuine digital file belonging to the batch having the batch value B only necessitates verifying that $k_i \otimes f(H(D_i))=B$, i.e. $k_i \otimes x_i=B$. The obtained compact (due to the accumulator property) verification key $k_i$, as part of verification information $V_i=(D_i, k_i)$ necessary for calculating B, is included in the digital security marking 110 in digital file $A_i$ together with the digital data $D_i$ of $A_i$. This is an important aspect of the invention as space available for data on a digital security marking is generally limited, particularly to perform offline checking of the authenticity of a secured digital file, and offline checking of conformity of its associated data with respect to that of a genuine original digital file. The one-way accumulator type for f is precisely chosen in view of the technical problem of reducing the size of the verification key data to be included in a digital security marking. Indeed, the property of quasi-commutativity (or, a fortiori, commutativity) of such accumulators allows signing data of a given digital file belonging to a batch of digital files without having to further include data relating to an ordering of the digital files in the batch or a rank of said given digital file according to the ordering in the batch. Moreover, the verification operations would be much more computer intensive without said quasi-commutativity property.

A computation module 120 is preferably included within a securing system 100 to execute the code provided for performing the computations for f(X), for the key values $k_i$ for the different digital files, and for the common (aggregated) B value. The securing system 100 may also include suitable modules for inputting (pre-programmed) values corresponding to the digital data $D_v$ of the virtual digital file $A_v$. Hashing of digital data $D_i$ of digital file $A_i$ to yield the corresponding digital file signature $x_i$ may also be performed, for example, in the computation module 120. It would also be possible to perform the digital file-related hashing computations externally (e.g. on a connected distant server), for example, wherever the digital files are created, so as to avoid having to transmit raw digital data $D_i$ over a network from that site (or sites) to the securing system 100, if that is a concern.

For each digital file $A_i$, corresponding verification information $V_i$ is compiled and is encoded in some form of machine readable security marking 110 that is then associated with the respective digital file.

For any "virtual" digital file $A_v$, its corresponding verification information $V_v$ may be associated internally with it by the securing system 100. The verification information generally at least includes, for any file $A_j$ of a batch of digital files, the corresponding digital data $D_j$ and the corresponding digital file verification key $k_j$: $V_j=(D_j, k_j)$. According to the invention, the encoding of data $D_i$ and that of data $k_i$ may differ (which provides an additional level of strength with respect to codebreaking attacks).

Additional digital data may further be associated with a digital file and may include, for example, the batch value B or any other information the system designer chooses to include, such as a file serial number, batch ID, date/time information, content name, a URL that points to other, online information associated with either the individual file (such as a digital image of a corresponding article, etc.), or the batch, or a telephone number one may call for verification, etc. The additional digital data may be stored in a searchable information database accessible to a user (via an information database interface).

Once the verification $k_i$ of an original digital file $A_i$ has been calculated, and included (i.e. via encoding or any chosen data representation), together with the corresponding digital data $D_i$, in the machine readable digital security marking 110 added to the original digital file, the resulting marked original digital file and its associated digital data is in fact secured against forgery and tampering. An advantage of the invention is that no encoding/decoding key is included in the digital security marking.

There are many known methods for encoding information in a way that it can be displayed as a digital image of a machine readable pattern. Any such method may be used in implementations of any embodiment of this invention. One common form of image of a digital marking is a well-known QR code. As is well known, for a given displayed area, the more data a QR code is able to encode, the higher the module density (roughly, density of black/white "squares") it has and the greater resolution it requires to print and read. In addition to its density (in number of modules squared), QR codes are also generally classified depending on what level of error correction they include. At present, the four different standard "levels", L, M, Q, and H, each representing the degree of "damage", that is, data loss, the QR code image can sustain and recover from. The levels L, M, Q, and H can sustain roughly 7%, 15%, 25% and 30% damage, respectively. The following table shows at least approximate values for different QR code versions:

| Version | Size (in modules) | Number of encodable bits | |
|---|---|---|---|
| | | ECC level L | ECC level H |
| 10 | 57 × 57 | 2192 | 976 |
| 25 | 117 × 117 | 10208 | 4304 |
| 40 | 177 × 177 | 23648 | 10208 |

Not all of the bits may be used to encode a data "load", however, since some modules are used for scan targets, a mask pattern, and the error-correction modules. There is thus a trade-off between the amount of information that a QR code (or whatever marking 110 is used) can encode, and how much information is included in a verification information V and must be encoded.

For a chosen type of digital security marking 110 (such as a QR code), with a limited encoding capacity, a suitable encoding function f(X) should therefore also be chosen: a function of which output is too large in terms of required bits may be impossible to use at all, and a function of which range is too small may not be secure enough. Moreover, in many applications, scalability may be an issue. For example, some data security schemes involve signatures that grow as the number of members of a batch increases, and that could impermissibly limit the size of a batch from the perspective of how many bits the digital security marking 110 can encode. This is why, according to the invention, the type of function chosen is the one-way accumulator.

In one illustrative embodiment, the one-way accumulator function f(X) is chosen to be a mere (commutative) modular multiplication, that is f(x)=x mod m, and f(x, y)=x⊗y=x*y mod m.

Thus, here we have f(x, y)=f(x)*f(y) and:

$$f(X) = \prod_{i=1}^{\mu} x_i \bmod m = \left(\prod_{i=1}^{\mu} x_i\right) \bmod m$$

i.e. $f(X)=x_1 \otimes x_2 \otimes \ldots \otimes x_\mu$, where m is the modulus and X corresponds to the μ digital file signatures of the ☐ digital files in the batch $X=(x_1, \ldots, x_\mu)$. The modular multiplication is a very simple example of one-way accumulator (not only quasi-commutative but also commutative), although not robust. Thus, in words, the batch value B=f(X) is computed by multiplying all the digital file hash values $x_i$ together, and then taking the remainder of this product after division by the modulus m. In some cases, this might lead to an impractically large product. For example, assume that there are 1000 digital files in a batch, and each hash value xi is 256 bits long (as obtained with a SHA-256 hash function). To do 999 multiplications and store the result, and then have to do the division by m to get the remainder, would be possible, but clumsy, and require unnecessary computational effort in the form of storing values without truncation. Instead, the system may make use of the property of modulo operations that the result may be computed iteratively, pairwise, as illustrated in the following pseudocode:

B=1

For j=1 to ☐

B:=[B*x(j)] mod m

Next j

The value B may thus be computed without ever having to multiply more than two hash values before determining the product modulo m.

Of course, any other method may be used to compute f(X) using the product-modulo-m method shown above. A similar algorithm may be used to compute the verification keys $k_i$—to compute key $k_i$, simply skip the step in which j=i.

There are several advantages of using the product-modulo-m method for determining the batch value B and the verification keys. One advantage is that the bit length will not be greater than m, which may be chosen by the user. Moreover, the computations require no floating-point operations and thus there will be no errors due to truncation—note that a change of a single bit in a digital file signature will produce a totally different batch value.

The choice of the integer modulus m also reflects a trade-off between security and size, both of the number of bits that the digital security marking 110 can encode, and of the number of files in a batch. To illustrates, assume a highly simplified example of batch that includes only three digital files, having digital file signature hash values $x_1, x_2, x_3$. Now assume that $m>\max(x_1, x_2, x_3)$, then:

$x_1$ mod m=$x_1$, $x_2$ mod m=$x_2$, and $x_3$ mod m=$x_3$

In other words, with this choice of m, there is no security for single values of H. On the other hand, unless m is chosen to be $m>>\max(x_1, x_2, x_3)$, then it is unlikely that the product of any two of the hash values modulo m will stay the same value, and it is even less likely that the product of all three will. The more files and thus hash values in a batch, the more the total product will "wrap around" the modulus m (have a non-zero divisor) and the more difficult it will be to use a "brute force" attack to find a "fake" multiplicand (digital file hash value) that, multiplied by a known key value, will yield the same batch value, modulo m. As a very simple example, assume that $x_1, x_2, x_3$ and m are 3, 6, 8 and 10.

3 mod 10=3, 6 mod 10=6, and 8 mod 10=8 but

B=3×6×8 mod 10=144 mod 10=4

If the verification key for the first digital file is given as 6×8 mod 10=8, and the batch value B=4, in order to guess the digital data hash value 3, one would still need to guess over a set of ten possibilities. The complexity will of course grow as the bit lengths of $x_i$ and m grow. Especially for batches of more than ten digital files, or more than 100 digital files, with m set to be $m>\max_i(x_i)$, for example, to the maximum value that can be represented for a given bit length (such as 256 for an implementation that uses a SHA-256 hash function), it will be computationally inefficient for a malicious actor to try to fake the hash value for each signature of a batch of digital files, especially in implementations in which importance, or even financial value, of each digital file in the batch is too low to justify attempting such an attack. In other words, using this embodiment, it is simply not worth the effort to try to fake the information encoded in the marking.

The choice $m>\max(x_1, x_2, \ldots x_\mu)$ has the advantage that there is an equivalence property for all the hash values ($x_i$ mod m=$x_i$), but this is not necessary. Rather, any value may be chosen, in particular, to provide a desired bit length for B. It is also not necessary for m to be constant across all implementations of the invention, or even for all batches. As one example, an administrator, service provider, etc., could choose a different modulus m for different batches. These could be stored in a database either in the securing system 100, or elsewhere, or be delivered via some other channel to a user, such as a recipient of the digital files, to enable only that recipient to easily verify digital files from their digital security marking 110.

To avoid having to maintain modulus values in a database, it would also be possible to compute m itself per-batch, for example, as a function of the hash values $x_i$. As just one example, m could be chosen as $m=[\max(x_1, x_2, \ldots x_\mu)]+1$. The module 120 could then determine the modulus m before performing the other calculations such as f(X), $k_i$ and B. The module 120 could also input a user-selected encoding size (such as a QR code version) and determine an appropriate modulus (and thus a bit size) to ensure that the encoded data ($D_i, k_i$) in the digital security marking will fit, i.e. the data necessary to retrieve $x_i=H(D_i)$ and calculate the batch value B from:

$$f(x_i \otimes X^i) = x_i \otimes f(X^i) = f(X^i) \otimes x_i = k_i \otimes x_i.$$

A user, recipient of a digital file such as $A_1$ for example, may then scan (or otherwise read) with a reader the digital security marking on $A_1$ and extract the digital data $D_1$ and the verification key $k_1$, (and any other information that may have been encoded into the digital security marking). An example of reader is a computer with a display For the sake of verification of the marked file $A_1$, the user must first retrieve the verification information $V_1=(D_1, k_1)$ from the digital security marking on $A_1$ and thus, calculate the digital file signature $x_1$ from the extracted digital data $D_1$: to do that the user must know the one-way function to be used for calculating a digital file signature, here the hash function H( ) and then perform the operation $x_1=H(D_1)$ to obtain the full data ($x_1, k_1$) necessary to calculate a corresponding candidate aggregated digital signature $B^c$. The user may for example receive the one-way function securely (for example, using a public/private key pair) or by requesting this from the digital file provider or whichever entity having created the signatures and keys, or having it already programmed in a user's processing unit of its reader.

Next, in order to calculate such candidate aggregated digital signature $B^c$, the user will need to further know the type of one-way accumulator f( ) to be used for that, here the user needs to know the modulus m of the modular multiplication (or similar information if some other function f was used). Assuming that a "standard" modulus is not used, for example, for all digital files from the provider, the user may then receive the modulus in any known manner, either securely (for example, using a public/private key pair) or simply by requesting this from the digital file provider or whichever entity created the verification data, or having it already programmed in the user's processing unit.

With the modulus m, the user may then compute a candidate aggregated digital signature $B^c=k_1 \otimes x_1$, which should then be equal to the available (or published) B value: this value may have been previously acquired by the user and/or already stored in a memory of the reader's processing unit, it could also be a value that the recipient requests and receives from the system administrator in any known manner. If the candidate $B^c$ and the available aggregated digital signatures B match, this computation then verifies the information in the secure digital marking 110 and confirms that the digital file $A_1$ is from the correct batch.

A link to access the batch value B for the batch corresponding to the digital file $A_1$ could be included in the digital security marking 110 (for example, a web address, if B can be retrieved on a corresponding web site), although it is not a preferred variant.

In some implementations, recipients of a digital file $A_j$ may be capable of "visually" extracting the data corresponding to the digital data $D_i$ directly from the digital file. For example, the data might be textual, such as a serial number, or text in a descriptive writing, or some alphanumerical encoding and human readable from the digital files themselves. Recipients of digital files could also be provided with appropriate software, such as a module in a reader device such as a smart phone, a computer or a tablet, that either inputs data, or reads data, and which then computes $x_i=H(D_i)$ for the digital file at hand. For example, with a digital security marking 110 on digital file $A_1$ being a standard QR code, a user could easily obtain by decoding the QR code with a computer, using a standard QR code decoding application running on the computer, the digital data $D_1$ and digital file verification key $k_1$, a verification application in the user's computer could then compute $x_1=H(D_1)$ and $B^c=f(X)=f(x_1 \otimes X^1)=x_1 \otimes f(X^1)=f(X^1) \otimes x_1=k_1 \otimes x_1$, and compare this value with the available batch value B, as explained above. For example, if the operator $\otimes$ corresponds to the modular multiplication, then $k_1 \otimes x_1=(k_1 * x_1) \bmod m$.

Preferably, the aggregated digital signature (i.e. batch value) B is stored in a searchable aggregated signature database that can be accessed (via a communication link) by the user by means of its computer equipped with a communication unit, as this is the case with the above example of a smart phone. The user having to verify the digital file $A_1$ can just send a request with its smart phone to the address of the database, via a signature acquisition interface of the database, the request containing the digital data $D_1$ read on the digital security marking 110 in $A_1$ (or the calculated digital file signature $x_1=H(D_1)$) allowing to retrieve the corresponding batch value B, and the acquisition interface will return the aggregated digital signature B to the smart phone (or computer). The database may be secured by a blockchain in order to strengthen the immutability of the stored aggregated digital signatures. An advantage of the invention is to make the link between a physical object, i.e. an original digital file (as stored in a memory, for example), and its attributes, i.e. the associated digital data and its belonging to a batch of digital files, practically immutable through the corresponding aggregated digital signature.

The above mentioned verification process of a digital file $A_i$ may also serve to authenticate human readable data content of $A_i$ on a corresponding printed version of the digital file $A_i$. Indeed, a user can read on a display of a computer the corresponding digital data $D_i$ as decoded from the digital security marking in the digital file $A_i$ by the imager, and visually check that the displayed information is consistent with the printed data on the printed version of the digital file.

In a preferred embodiment, the digital data $D_i$ further include characteristic digital data (CDD) of corresponding unique physical characteristic of an object, or an individual, associated with the marked original digital file $A_i$ that can be used for (materially) authenticating the associated object, or the associated individual, by comparing the characteristic digital data extracted from the digital security marking and corresponding detection data of the unique physical characteristic obtained from a suitable sensor. Thus, with the characteristic digital data corresponding to the unique physical characteristic in a digital file $A_i$ being $CDD_i$, the corresponding unique physical signature data $UPS_i$ can be obtained by encoding of $CDD_i$ (preferably by means of a one-way function): for example, by taking a hash of the characteristic digital data $CDD_i$, i.e. $UPS_i=H(CDD_i)$. However, any other known encoding could be used instead: for example, in order to have a short signature, it is possible to use an elliptic curve digital signature algorithm. As an illustrative very simplified example of characteristic digital data $CDD_i$ corresponding to a unique physical characteristic of an object $OBJ_i$ associated with a digital file $A_i$, we consider a mere digital image obtained by imaging the object $OBJ_i$ (or a specific zone on $OBJ_i$), for example by means of the camera of a smartphone, the corresponding unique physical signature data $UPS_i$ being, for example, a hash of the digital image, $UPS_i=H(CDD_i)$. The characteristic digital data $CDD_i$ having generated the signature $UPS_i$ is the reference characteristic digital data for $A_i$ and the obtained signature $UPS_i$ is the corresponding reference unique physical signature data for $A_i$. Preferably, $UPS_i$, i.e. the reference unique physical signature data for digital file $A_i$, is stored in a searchable database or in a blockchain (or in a database secured by a blockchain) accessible to the users (for example, via a request containing the digital data $D_i$ read on the digital security marking in the digital file $A_i$, or its corresponding digital file signature $x_i$). Thus, the stored $UPS_i$ acquires an immutable character. A copy of $CDD_i$ may be further stored in the memory of the user's smartphone (or reader or computer). In a variant of the embodiment, a copy of $UPS_i$ may also be further stored in the memory of the user's smartphone (or reader or computer) to allow offline checking operation.

A check of authenticity of the digital file $A_i$ may be performed by extracting candidate characteristic digital data $CDD_i^c$ from the digital data $D_i$ read (here, with a decoding application running on the smartphone) on the digital security marking included in the digital file $A_i$, and comparing it with the reference characteristic digital data $CDD_i$ stored in the memory of the smartphone: in case of matching $CDD_i^c=CDD_i$, the digital file $A_i$ is considered as genuine (its digital content corresponds to that of a genuine marked original digital file). If the reference characteristic digital data $CDD_i$ is not stored in the memory of the smartphone, but instead the reference unique physical signature data $UPS_i$ is stored in the memory of the smartphone (with the advantage of taking up much less memory compared with $CDD$), then the authenticity of $A_i$ can still be checked by verifying that the candidate unique physical signature data $UPS_i^c$ obtained by calculating the hash value of the candidate characteristic digital data $CDD_i^c$ extracted from the digital data $D_i$, i.e. $UPS_i^c=H(CDD_i^c)$, matches the reference unique physical signature data $UPS_i$ stored in the memory.

A user may further check the authenticity of a received digital file $A_i$, still via offline (self-verifying) process, by detecting said unique physical characteristic on the object or individual associated with the digital file $A_i$, by means of a sensor capable to perform such measurement (here, the camera of the smartphone), and obtaining a candidate characteristic digital data $CDD_i^c$ from the detected characteristic (here, a digital image taken by the smartphone). Then, the user can compare (via the image processing unit of its smartphone, or visually on a display of the smartphone) the obtained $CDD_i^c$ with a copy of the reference $CDD_i$ (stored in the memory of the smartphone): in case of "reasonable" matching $CDD_i^c \approx CDD_i$ (i.e. the two digital data agree within some given tolerance or similarity criterion), the digital file $A_i$ is considered as genuine (i.e. its digital content corresponds to that of a genuine marked original digital file).

Moreover, the user may also further calculate the corresponding candidate unique physical signature data from the copy of the reference $CDD_i$ stored in the memory of the smartphone as $UPS_i^c = H(CDD_i)$, and compare it with the reference physical signature data $UPS_i$ stored in the memory of the smartphone: in case of matching $UPS_i^c = UPS_i$, the digital file $A_i$ is confirmed as being genuine with an even higher degree of confidence (as merely one bit of difference is enough to cause a mismatch). Moreover, in case of matching, the digital data $D_i$ associated with $A_i$, which has been verified as corresponding to that of a genuine digital file, as explained above by retrieving the corresponding batch value B from the read verification information $(D_i, k_i)$ stored in the digital security marking in $A_i$, is also authenticated.

In a variant of the embodiment, the checking of authenticity of a digital file $A_i$ by a user may be performed via online process. In this case, the reference data, i.e. the characteristic digital data CDDi and/or the reference unique physical signature data UPSi, are stored in a searchable database accessible to the user wherein the reference data relating to a digital file $A_i$ are stored in association with, respectively, the corresponding digital data $D_i$ (included in the digital security marking in $A_i$) or with the corresponding digital file signature $x_i$ (that can be calculated by the user once the data $D_i$ is extracted from the digital security marking via the operation $x_i = H(D_i)$): the reference data can be requested by sending to the database a query containing, respectively, $D_i$ or $x_i$.

A conventional way of securing an object is to apply on it a material-based security marking (possibly tamperproof), i.e. a marking having detectable intrinsic physical or chemical property that is very hard (if not impossible) to reproduce. If an appropriate sensor detects this intrinsic property on a marking, this marking is then considered as genuine with a high degree of confidence, and thus also the corresponding marked object. There are many examples of such known authenticating intrinsic properties: the marking can include some particles, possibly randomly dispersed, or has a specific layered structure, having intrinsic optical reflection or transmission or absorption or even emission (luminescence, for example, or polarization or diffraction or interference . . . ) properties, possibly detectable upon specific illumination conditions with "light" of specific spectral content. This intrinsic property can result from the specific chemical composition of the material of the marking: for example, luminescent pigments (possibly not commercially available) can be dispersed in an ink used for printing some pattern on the object and are used to emit specific light (for example, in a spectral window within the infrared range) upon illumination with a specific light (for example, with light in the UV spectral range). This is used for securing banknotes, for example. Other intrinsic properties can be used: for example, the luminescent particles in the marking can have a specific luminescence emission decay time after illumination with an appropriate excitation light pulse. Other types of intrinsic properties are the magnetic property of included particles, or even a "fingerprint" property of the object itself such as, for example, the relative positioning of inherently randomly dispersed fibers of a paper substrate of a document, in a given zone on the document, which, when observed at sufficient resolution, can serve to extract a unique characterizing signature, or some random printing artefacts of data printed on the object which, viewed with sufficient magnification, can also lead to a unique signature etc. . . . . The main problem with an inherent fingerprint property of an object is its robustness with respect to aging or wear. However, a material-based security marking does not always allow also securing data associated with the marked object: for example, even if a document is marked with a material-based security marking like a logo printed with a security ink in some zone of the document, data printed on the remaining part of the document can still be falsified. Moreover, too complex authenticating signatures often necessitate significant storage capabilities involving external databases, and communication links for querying such databases, so that offline authentication of an object is not possible. According to the invention, an object marked by means of a material-based security marking and associated with a (digitally) marked digital file is secured by the entanglement resulting from the fact that the characteristic digital data corresponding to the unique physical characteristic of the marked object, or its corresponding unique physical signature data, is immutably (thanks to the publication or storage of the aggregated digital signature in a blockchain) and forgery-proof linked with the digital data in the digital security marking being part of the associated digital file. The invention can thus be used for both securing a batch of objects and a corresponding batch of associated digital files.

Of course, any other known intrinsic physical/chemical property can be used to obtain the characteristic digital data $CDD_i$ relating to a unique physical characteristic of an object $OBJ_i$ associated with a digital file $A_i$, and the corresponding unique physical signature data $UPS_i$. As another illustrative example, it is possible to print a 2D barcode forming a material-based security marking on an object with a security ink including a luminescent pigment having its characteristic decay time constant as well as its light excitation wavelength window and its luminescence emission wavelength window: the result is an ink having a specific reference decay time value T that serves as a material "fingerprint" of the ink. It suffices to illuminate the barcode with excitation light in an illumination wavelength window covering the pigment excitation wavelength window, and collect a resulting luminescence light from the barcode with a sensor capable to detect light intensity within the luminescence emission wavelength window in order to authenticate the barcode, and thus the object. For example, a user's reader may be equipped with a flash capable to deliver the excitation light to the barcode, a photodiode capable to collect the corresponding luminescence light intensity profile I(t) (over a detection time interval) from the barcode, and the reader's CPU being programmed to calculate a decay time value from the collected intensity profile I(t). For example, the excitation wavelength window may be within the UV (ultra violet) band and the emission wavelength window within the IR (infra red) band. If, during verification of the object, the luminescence light intensity collected by the user's imager shows a characteristic decay over time corresponding to a candidate decay time $\tau_c$, then the ink, and consequently the object, is considered as genuine if $\tau_c \approx \tau$ (within a given range of tolerance). In this case, the characteristic digital data $CDD_i$ of a marked object $OBJ_i$ includes at least the reference decay time value $\tau$ (and possibly data relating to the excitation wavelength window and the emission wavelength window). As it is clear from the above examples, including reference (unique) characteristic digital data in the verification information of a digital security marking of an associated digital file $A_i$ has the technical effect of providing a forgery-proof link between the digital data of the digital file and the authentication data of its associated object.

Instead of the product modulo m of the above illustrative example, any other known (commutative or quasi-commutative) one-way accumulator may be used (with its corresponding operator $\otimes$). For example, the quasi-commutative one-way accumulator defined by $f(x)=f(I; x)=I^x \mod m$ (i.e. exponentiation modulo m), or by the equivalent symbolic operator notation $I \otimes x$, where I is a given number (integer) and m is the given modulus. Thus, $f(x,y)=f(I; x, y)=f(f(I; x), y)=f(I; x) \otimes y=(I^x \mod m)^y \mod m=I^{x*y} \mod m=I \otimes x*y$. The aggregated digital signature B for a batch of µ digital files $A_1, A_2 \ldots A_\mu$ (that may include virtual files) of which respective digital data are $D_1, D_2 \ldots D_\mu$, with corresponding associated digital file signatures $x_1, x_2 \ldots x_\mu$, is calculated for $X=(x_1, x_2 \ldots x_\mu)$, as $B=f(I; X)$, i.e.:

$$B=f(f(f(\ldots f(f(f(I,x_1),x_2),x_3),\ldots x_{\mu-2}),x_{\mu-1}),x_\mu),$$

which can be reduced, based on the quasi-commutativity of f, to:

$$B=f(X)=f(I;X)=(I^{\Pi x_i}) \mod m = I \otimes \Pi x_i,$$

where $\Pi x_i$ designates the product from i=1 to i=□ of the digital file signatures components $x_1, x_2, \ldots x_\mu$ of X, i.e. $\Pi x_i = x_1 * x_2 * \ldots * x_\mu$. Indeed, the quasi-commutativity of this one-way accumulator allows writing (for all I and all x, y): $f(f(I;x),y)=f(f(I;y),x)$, with the above mentioned resulting advantage that the verification step does not necessitate having additional ordering information of the signatures $x_i$.

The digital file signatures $x_i$ are calculated, as explained above, by means of any known one-way function. Preferably, the digital file signature $x_i$ is obtained by a hash function of the corresponding digital data $D_i$: $x_i=H(D_i)$ (for above mentioned reasons). The digital file verification key $k_j$ corresponding to the digital file signature $x_j$ of the digital data $D_j$ of a digital file $A_j$ from a batch of □ digital files is thus calculated as: $k_j=I(\Pi x_i/x_j) \mod m$, with $(\Pi x_i/x_j)=x_1*x_2* \ldots *x_{j-1}*x_{j+1} \ldots *x_\mu$, or with the symbolic notation $k_j=I \otimes x_1*x_2* \ldots *x_{-1}*x_{j+1} \ldots *x_\mu$.

With the notation $X_j=(x_1*x_2* \ldots *x_{j-1}*x_{j+1} \ldots *x_\mu)$, we have the more compact formula $k_j=f(X_j)$, with $(\Pi x_i/x_j)=x_1*x_2* \ldots *x_{j-1}*x_{j+1} \ldots *x_\mu$ being the product of the components of $X_j$.

Consequently, the operation of checking that the digital data $D_j$ and the digital file verification key $k_j$ from a digital security marking of a digital file $A_j$ indeed correspond to the data of a genuine digital file belonging to the batch having the batch value B only necessitates calculating the digital file signature $x_j$ as $x_j=H(D_j)$ and then verifying that $x_j$ and $k_j$ allow retrieving the aggregated digital signature B via:

$$k_j^{H(D_j)} \mod m = k_j^{X_j} \mod m = B \text{ (or } k_j \otimes x_j = B).$$

Preferably, the (integer) modulus m is chosen to have a size of at least 2048 bits in order to provide good robustness with respect to codebreaking attacks.

The above exponentiation operator (and all its known "variants", like the Naccache operator $f(x)=I^x C^{x-1} \mod m$, for any given numbers I and C, for example) is just another example of one-way accumulator given here for illustrative non-limitative purpose.

Another illustrative embodiment of the invention relates to a batch of digital biometric identification documents, e.g. digital biometric passports, as shown on FIG. 2. Each digital passport, as a digital file, is associated with a corresponding individual, i.e. the owner of the passport. For clarity reason, the digital data of A1 is represented on FIG. 2 as equivalent textual and alphanumerical information (i.e. human readable), for example, as it could be displayed from a digital pdf ("Portable Document Format") file, and the digital security marking is shown as equivalent conventional QR code two-dimensional pattern.

In this example we still use a hash function as a one-way function for signing the passport digital data, preferably a SHA-256 hash function in view of its well-known robustness. Indeed, in view of a given size of the batch, the hash function that is selected (having its known bucket listing) for the purpose of signing the passport digital data is thus an example of a one-way encryption function such that each distinct digital passport has its distinct digital passport signature, which thus make the signature unique. The domain of a hash function (i.e. the set of possible keys) being larger than its range (i.e. the number of different table indices), it will map several different keys to a same index which could result in collisions: such collisions can be avoided, when the size of the batch is known, by considering the bucket listing associated with the hash table of a hash function and retaining only a function giving zero collisions, or by independently choosing a hash-table collision resolution scheme (for example, such as coalesced hashing, cuckoo hashing, or hopscotch hashing).

Figure 2A:
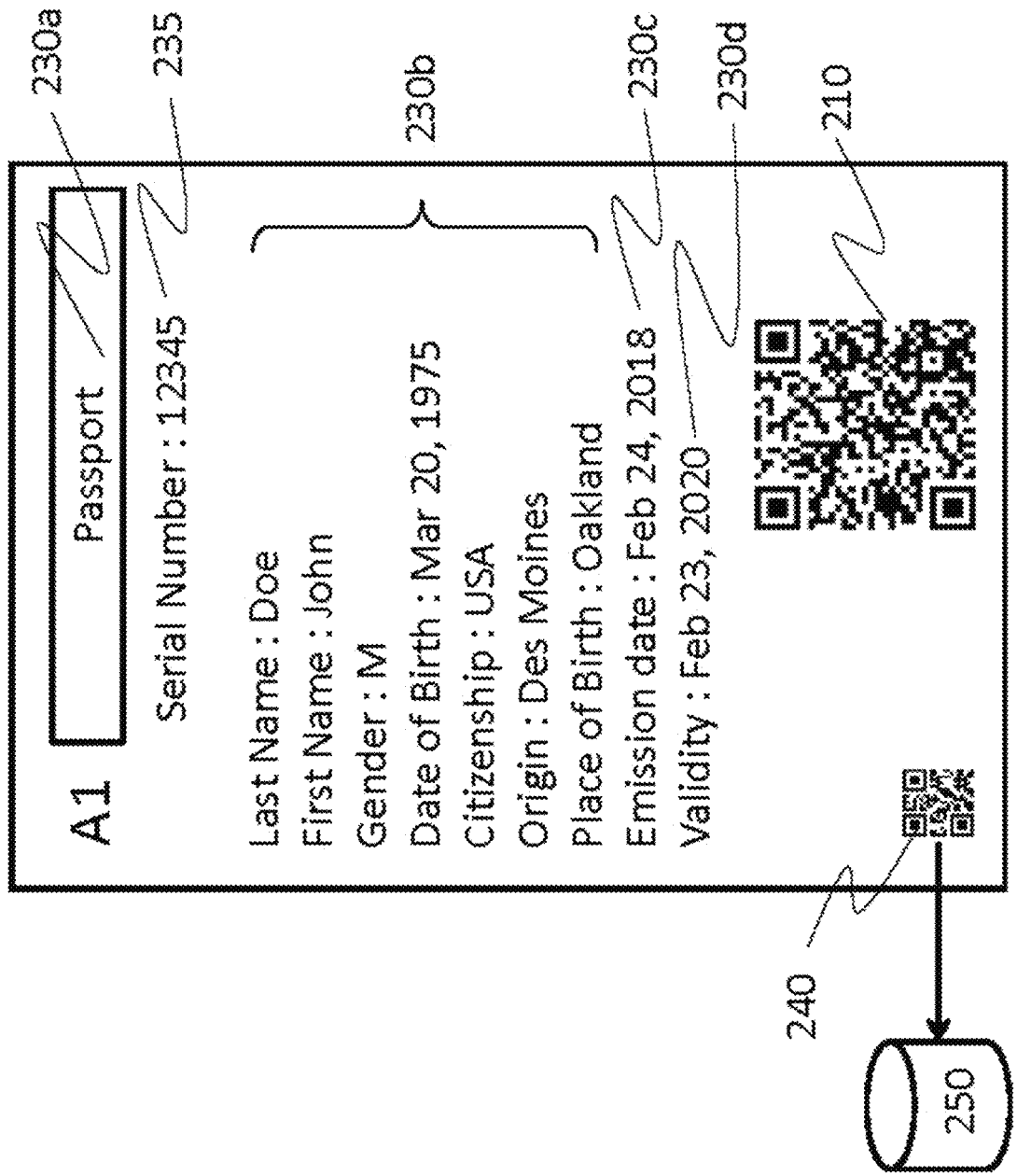
FIG. 2A illustrates a secured digital biometric passport as an example of digital biometric identity document secured according to the invention.

FIG. 2A shows an example of digital biometric passport $A_1$ secured with a machine readable digital security marking 210 (here a QR code) encoded in $A_1$, and comprising passport digital data 230 containing conventional passport data, e.g. digital data representing a title of the document 230*a* ("Passport"), a set of biography data of the owner of the passport 230*b*: last name ("Doe"), first name ("John"), gender ("M"), date of birth ("Mar. 20, 1975"), citizenship ("USA"), origin ("Des Moines"), place of birth ("Oakland"), a date of emission of the passport 230*c* ("Feb. 24, 2018") and a validity period 230*d* ("Feb. 23, 2020"). These passport digital data may further comprise some (unique) serial number(s) 235 assigned by the authority delivering the passport (here "12345"). The passport digital data further comprise biometry data of the owner of the passport as characteristic digital data (CDD) corresponding to a unique physical characteristic of an individual associated with the digital passport. A machine readable representation 230*e* (e.g. an alphanumeric one) of data characterizing said unique physical characteristic (not shown), corresponding to said biometry data, is associated with the passport digital data 230. A representation of digital data is to be understood in a broad sense of the term: this representation of data only needs to enable retrieving the original digital data. The machine readable data representation 230*e*, i.e. the biometry data, of the unique physical characteristic may correspond, for example, to fingerprint identification data or iris identification data of the owner of the digital passport. For example, biometry data 230*e* corresponding to a fingerprint of a person may result from an analysis of a set of specific minutia features of fingerprint ridges like ridge ending, bifurcation and short ridges (according to the conventional Henry System of Classification).

Thus, for a given digital passport $A_j$ of the batch of u delivered digital biometric passports, here with µ=1024, the associated passport digital data $D_i$ includes the above mentioned digital data 230*a*-230*e*. Preferably, additional passport digital data are associated with the above mentioned passport digital data 230. For example, a digital image of the fingerprint pattern of the owner of the passport, or a digital identity photograph etc. In a variant of the embodiment, these additional passport digital data are stored in a searchable information database 250 that can be searched via an information request containing some passport data (for example, the name of the owner or the biometry data or data from the security marking or the unique serial number 235) to retrieve the corresponding fingerprint pattern data and receive it back. Preferably, a link to the information database 250 is included, as information access data 240, in the digital passport: here this information access data is encoded in a digital representation of a QR code containing a reference index to retrieve corresponding additional data in the information database 250. However, in a variant of passport control operation involving access to a distant information database (online operation), the QR code could contain, for example, the URL of the information database that is accessible via the web.

A digital passport signature with a one-way hash function of the passport digital data $D_j$ corresponding to the passport digital data 230a-230e of the digital passport $A_j$ is then calculated by means, for example, of the above mentioned robust SHA-256 hash function to obtain the corresponding (unique) passport digital signature $x_j = H(D_j)$. In a same way, the passport digital signatures of all the digital passports in the batch, for all the different owners, are calculated.

From all the digital signatures of the digital passports in the batch, an aggregated digital signature B is calculated with a one-way accumulator. For example, in this embodiment, the aggregated signature for the batch is obtained by means of the above mentioned exponentiation modulo m one-way accumulator defined by $f(x) = I^x \mod m$, where I is a given integer number and m is the modulus. Thus, the aggregated digital signature B for a batch of u digital biometric passports $A_1, A_2 \ldots A_\mu$ (that may include virtual digital passports) of which respective passport digital data are $D_1, D_2 \ldots D_\mu$, and with corresponding associated passport digital signatures $x_1 = H(D_1)$, $x_2 = H(D_2)$, ..., $x_\mu = H(D_\mu)$, is calculated for $X = (x_1, x_2, \ldots, x_\mu)$, as:

$$B = f(X) = (I^{\Pi x_i}) \mod m,$$

where $\Pi x_i$ designates the product from i=1 to i=μ of the passport digital signatures $x_1, x_2, x_\mu$, i.e. $\Pi x_i = x_1 * x_2 * \ldots * x_\mu$, and the size of the modulo m is chosen to be of 2048 bits, for example. As explained above, with the notation $X^j = (x_1, x_2, \ldots *x_{j-1}, x_{j+1}, \ldots, x_\mu)$, the verification key $k_j$ for a digital passport $A_j$ is calculated as the partial one-way accumulator $k_j = f(X_j)$, and the verification information $(D_j, K_j)$ is included in the digital security marking 210 of the passport $A_j$. The operation of checking that the passport digital data $D_i$ and the verification key $k_j$ of a digital biometric passport $A_j$ indeed correspond to digital passport data of a genuine digital biometric passport belonging to the batch of digital biometric passports having the batch value B only necessitates calculating the passport digital signature $x_j = H(D_j)$ and verifying that x; and the verification key $k_j$ allow retrieving the available corresponding batch value B via: $k_j^{x_j} \mod m = B$ (or $k_j \otimes x_j = B$). Thus, a digital biometric passport secured according to the invention provides both a forgery-proof link between the "personal data" and the "biometry data" of its holder, and a unique and a forgery-proof link between the physical person of the holder and the holder's identity.

Figure 2B:
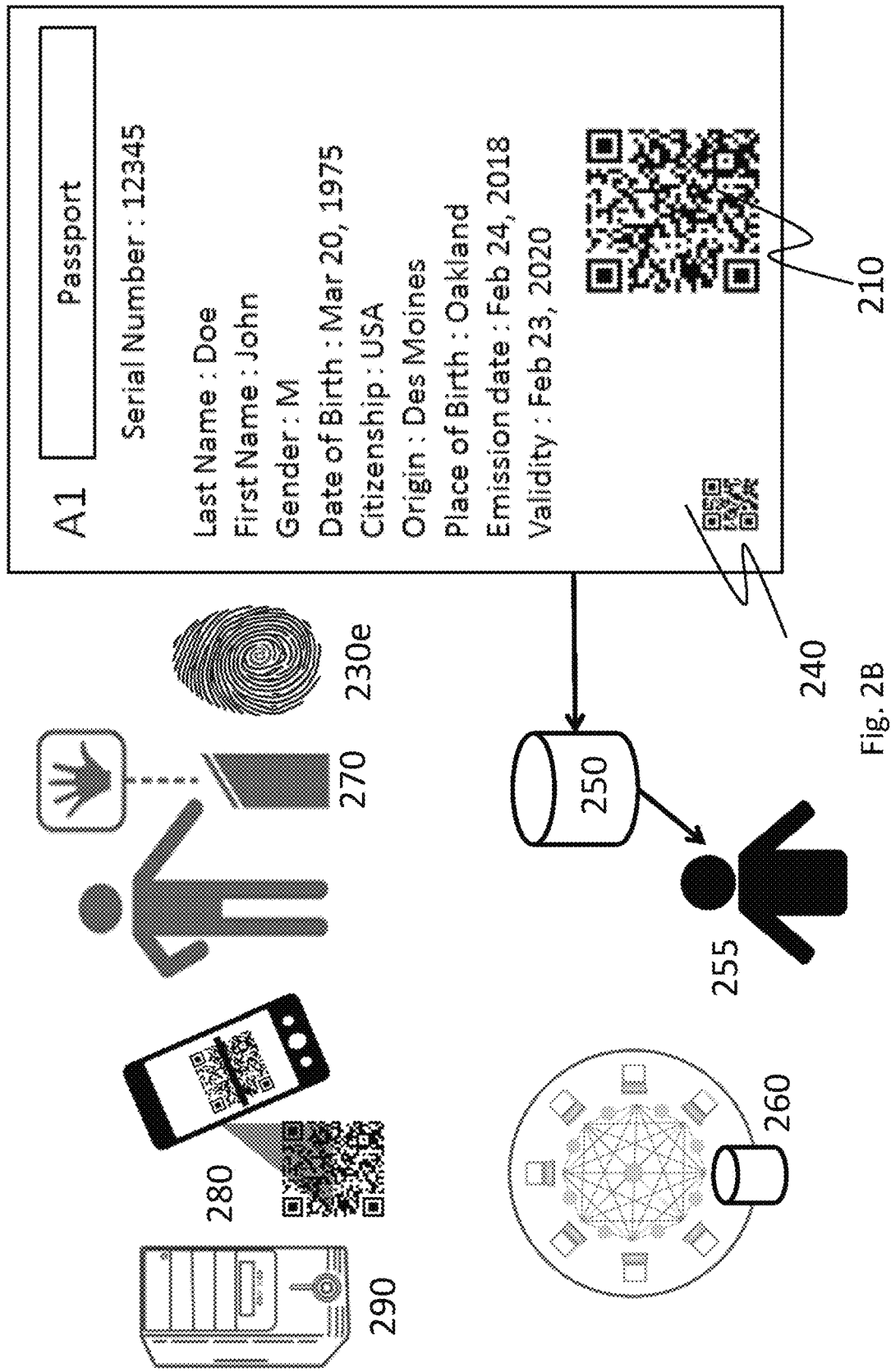
FIG. 2B illustrates a control of an individual having the secured digital biometric passport of FIG. 2A by an authorized officer.

FIG. 2B illustrates a control process of the secured digital biometric passport $A_1$ of FIG. 2A, with its passport digital data 230 corresponding to a certain John Doe, with its biometry data 230e corresponding to John Doe's fingerprint, and with additional passport digital data corresponding to a digital identity photograph 255 of John Doe that is accessible via the link to the information database 250 included in the information access data 240. The passport data further comprises the unique serial number 235 assigned by the authority having delivered the passport. The digital security marking 210 of the digital passport contains the verification information $(D_1, k_1)$, with passport digital data $D_1$ corresponding to the passport data 230a-230d, the biometry data 230e and the unique serial number 235, and the verification key $k_1$ corresponding to $f(X^1)$, with notation $X^1 = (x_2, \ldots, x_{1024})$, $x_i = H(D_i)$ i=2, ..., 1024 and f being the exponentiation modulo m (with given values of the integers I and m). The batch value B is obtained from all the passport digital signatures $(x_1, \ldots, x_{1024})$ as $B = f(X)$, with $(X = x_1, \ldots, x_{1024})$. The calculated aggregated digital signature B may further be time-stamped and stored in a blockchain 260. In this example, the biometry data 230e of the respective holders of the digital biometric passports of the batch are also stored in the blockchain 260 in association with, respectively, their corresponding unique serial numbers (so as to make these data immutable). The stored biometry data of John Doe can be retrieved by sending a request to the blockchain 260 indicating the unique serial number 235 mentioned on his digital passport. The authorities in charge of controlling identity of people (for example, the police, the customs etc.) can access the blockchain 260 via a communication link, and, in this illustrative embodiment, have also local storage capabilities for storing the (published) aggregated digital signatures of all the delivered batches of digital biometric passports. In the example shown on FIG. 2B, the information database 250 is local (i.e. directly accessible to the authorities, without having to use a public communication network). Moreover, these authorities are equipped with fingerprint scanners 270 to capture the fingerprints of individuals and calculate corresponding machine readable representations of data characterizing the captured fingerprints, i.e. biometry data 230e.

During an identity control of John Doe, say by a police or a customs officer, the officer receives the secured digital biometric passport $A_1$ of John Doe, reads and decodes the verification information $(D_1, k_1)$ stored in the digital security marking 210 of the passport by means of an appropriate reader, that may be for example a suitably programmed computer 290, the computer being connected to the local storage capabilities 250. If John Doe has only a material, i.e. paper, biometric passport (marked with a printed security marking corresponding to the digital security marking 210), the officer can obtain the associated digital biometric passport $A_1$ by taking a digital image of the document with a scanner 280 connected to the computer 290, image processing the digital image to transform its data content into corresponding digital data, and storing the extracted digital data in the computer 290 as a digital file corresponding to a digital biometric passport $A_1$ of John Doe. Having read the passport digital data $D_1$ and the verification key $k_1$ and sent it to the computer 290, a dedicated application (with programmed hash function H and one-way accumulator) running on the computer 290 calculates the passport digital signature $x_1$ (as $x_1 = H(D_1)$) and a candidate batch value $B^c$ as $k_1^{x_1} \mod m = B^c$. Then, the computer can, for example, search in the local information database 250 a batch value B matching the value $B^c$: in case there is no matching, the digital passport is a forged one and "John Doe" (i.e. the screened individual claiming that his name is John Doe) may be arrested. In case $B^c$ matches some stored batch value B, the digital passport is considered as genuine and the officer may perform additional security checks:

the officer retrieves the digital identity photograph 255 stored in the information database 250, by sending a request via the computer 290 containing the serial number 235 in $A_1$, receives it back and display the received identity photograph 255 on a screen of the computer 290: the officer can then visually compare the displayed visage (i.e. that of a certain John Doe) with that of the individual being checked and estimate if the two visages are similar or not; and the officer retrieves the biometry data 230e on the digital passport $A_1$ by reading these data on the digital security marking 210 with the computer 290, and scans the individual's fingerprint by means of a fingerprint scanner 270 connected to the computer 290 and obtains the corresponding individual's biometry data: the officer then checks by means of a program running on the computer 290 if the retrieved biometry data 230e is similar (within a given margin of error) to the obtained individual's biometry data.

If the two visages and the biometry data are judged similar, everything is all right and the checked individual is indeed John Doe, the owner of the genuine digital biometric passport $A_1$ (and thus possibly, also of the material biometric passport from which $A_1$ has been obtained).

In case of any one of the above additional security checks fails, clearly, the individual in front of the officer is not the true holder of the genuine digital biometric passport $A_1$ and has probably stolen the passport of a certain John Doe. Thus, with a secured digital biometric passport according to the invention a mere offline check can quickly detect any fraud.

In fact, it is even possible to reduce a digital biometric passport document to a mere digital file with just a digital representation of a 2D barcode (like the above example of a QR code) including the verification information V=(D, k): with V comprising the holder's biography data and (unique) biometry data, like the holder's fingerprint (within the passport digital data D) and the verification key. Indeed, according to the invention, even this "reduced" secured digital passport takes full advantage of the above mentioned forgery-proof link created between the "personal biography data" and the "biometry data" of the passport holder, and the unique and forgery-proof link between the physical person of the holder and the holder's identity.

Another illustrative embodiment of the invention relates to components of an aircraft, as shown on FIG. 3. Due to the very high price of certain critical components from which failure could affect the security of the aircraft, like some parts of the reactors (e.g. turbine blades, pumps . . . ) or of the landing gear, or batteries etc. . . . , counterfeiters are interested to produce copies of these components but of course without complying with the required safety technical requirements due to their generally lower quality. Even if an aircraft component is generally marked with a corresponding unique serial number to identify it, that sort of marking may be easily counterfeited. These counterfeit airplane parts are generally defective and can cause severe damages or even plane crashes. This is a growing security problem today. Moreover, even if the components are genuine, they may not be convenient for certain versions of a same type of aircraft, and there is a serious risk that an inappropriate component is inadvertently used for repairing a given aircraft for example. It is thus important to secure at least the critical genuine components that are allowed for given aircraft.

Generally, each component has a corresponding (possibly digital) technical data sheet indicating e.g. the component technical name, the component unique serial number, the component manufacturer name, the manufacturing date of the component and certification information. Moreover, for a given aircraft, a corresponding record contains all the (digital) technical data sheets of its respective components. However, counterfeited components may have their corresponding fake digital technical data sheet and thus, it is not obvious (unless by performing technical tests, for example) to detect fraud. For example, how to be sure that a digital technical data sheet corresponds well to a component mounted on a specific aircraft (and vice versa)?

According to an illustrative embodiment of the invention, the allowed parts to be used for manufacturing or repairing a given aircraft, or that are mounted on the aircraft, are considered as belonging to a batch of "components" (or "objects") for that very aircraft. In the specific illustrative embodiment shown on FIG. 3, each component of an aircraft batch, i.e. each allowed aircraft component for mount or repair on a given aircraft, has a corresponding aircraft component digital identification document AC-ID that contains the same component digital data as in a conventional technical data sheet (e.g. the aircraft ID code, the aircraft manufacturer name, the component technical name, the component unique serial number, the component manufacturer name, and the manufacturing date of the component) together with additional digital data corresponding, to the aircraft ID code, the aircraft manufacturer name, the assembly date of the component on the aircraft, the name of the technician in charge of performing the conformity check together with the date of the conformity check, and the corresponding (unique) digital signature of the checker. Moreover, each aircraft component digital identification document AC-ID is secured by means of a machine readable digital security marking added to it. For clarity reason, the digital data of AC-ID:$A_{125}$ is represented on FIG. 3 as equivalent textual and alphanumerical information (i.e. human readable), and the digital security marking 310 is shown as equivalent conventional QR code two-dimensional pattern.

Preferably, each time a component or a set of components are replaced on the aircraft, corresponding secured digital AC-ID documents are created and a corresponding updated version of the aircraft batch is also created, with the above mentioned corresponding additional digital data (relating to the new mounting operations).

Thus, all the (critical) mounted components on a specific aircraft (here, having the aircraft ID reference HB-SNO), belong to a corresponding batch of mounted components (here, having a total of □ components) and are documented in a corresponding batch of associated μ digital files, i.e. the digital identification document AC-ID. A digital security marking 310 (here in the form of a 2D representation of a QR code) is included in each aircraft component digital identification document, for example AC-ID:$C_{125}$, that is associated with the corresponding aircraft component, here $C_{125}$, mounted on the aircraft HB-SNO. FIG. 3 particularly shows the component $C_{125}$ of the aircraft batch being a turbine blade adapted to the reactor type mounted on the aircraft HB-SNO and marked with a unique manufacturing serial number (here, 12781, generally engraved by the manufacturer). The component digital data $D_{125}$ in the digital security marking 310 of the aircraft component identification document AC-ID:$C_{125}$, associated with component $C_{125}$, comprises the digital data corresponding to that of the technical data sheet of $C_{125}$: the aircraft ID code 330a (here, HB-SNO), the aircraft manufacturer name 330b (here, AeroABC), the component technical name 330c (here, turbine blade—$1^{st}$ ring), the component serial number 330d (here, 12781), the component manufacturer name 330e (here, PCX), the manufacturing date of the component 330f (here, Nov. 13, 2017), the assembly date of the component on the reactor 330g (here, Feb. 24, 2018), the name of the technician in charge of performing the conformity check 330h (here, the checker is Martin White) together with the date of the conformity check 330i (here, Mar. 20, 2018), and the (unique) digital signature of the checker 330j (here, 2w9s02u).

A digital file signature $x_{125}$ of the digital data $D_{125}$ of the digital file AC-ID: $C_{125}$ of component $C_{125}$ is calculated by means of a one-way hash function H as $x_{125}=H(D_{125})$. In the same way, all the digital file signatures $x_i$ of the digital data $D_i$ of digital file AC-ID: $C_i$ of component $C_i$ are calculated by means of the one-way hash function H as $x_i=H(D_i)$ (here, i=1, ..., □). Let X correspond to the whole set of component digital signatures $X=(x_1, x_2, \ldots, x_\mu)$, and let $X^i$ correspond to the whole set of component digital signatures with the exception of the signature $x_i$, i.e. $X^i=(x_1, x_2, \ldots *x_{i-1}, x_{i+1}, \ldots, x_\mu)$. As already explained, an aggregated digital signature B for the batch of u aircraft component digital identification documents AC-ID:$C_1$ ... AC-ID:$C_\mu$ (digital files), of aircraft components $C_1, \ldots, C_\mu$, is calculated by means of a one-way accumulator f as B=f(X). The aggregated digital signature is then stored in a searchable database (preferably a blockchain) accessible to technicians in charge of controlling or changing the mounted components.

For a given digital file AC-ID: $C_i$ of the batch, a corresponding digital file verification key $k_j$ is calculated by means of the corresponding partial one-way accumulator as $k_j=f(X^i)$. For each component $C_j$ mounted on the aircraft HB-SNO, the associated digital data $D_j$ and the corresponding verification key $k_j$ are embedded in the digital security marking included in the corresponding aircraft component digital identification document AC-ID: $C_i$. For example, in case of a control operation of a component on the aircraft HB-SNO, a technician may send a request to the searchable database containing the component serial number 12781 read on the digital file AC-ID: $A_{125}$ of component $C_{125}$ to be controlled, or its verification key $k_{125}$ as read on the digital security marking 310 of the AC-ID: $A_{125}$ document with an appropriate reader, as for example a computer programmed for decoding the content of the digital security marking, and will receive back the corresponding batch value B. However, in a preferred variant allowing complete offline checking, the technician's computer has a memory storing all the aggregated digital signatures relating to the aircrafts to be controlled. In this latter variant, the technician can then check if the component is genuine by reading the component digital data $D_{125}$ on the digital security marking 310, checking that the unique serial number 330d (here, 12781) extracted from $D_{125}$ matches the serial number physically marked on the mounted aircraft component $C_{125}$, calculating the corresponding component digital signature $x_{125}$ (for example, by running a programmed application on a CPU of the computer which calculates the signature $x_{125}=H(D_{125})$ from the read digital data $D_{125}$), calculating a candidate batch value $B^c$ via the one-way accumulator function programmed on the computer's CPU as $B^c=k_{125} \otimes x_{125}$ (the operator $\otimes$ corresponding to the one-way accumulator f), and checking that the candidate batch value $B^c$ matches one of the batch values stored in the computer's memory (i.e. B, corresponding to the batch of digital files for the aircraft HB-SNO). In case of full matching (i.e. the serial numbers match and $B^c=B$), the component $C_{125}$ is considered as genuine and belongs to the (up-to-date) aircraft batch of allowed components of the HB-SNO aircraft, if $B^c$ does not match a stored batch value B, or if the serial numbers do not match, the component $C_{125}$ is possibly counterfeit, or is a genuine component not allowed for the aircraft HB-SNO (e.g. $C_{125}$ does not belong to the right batch for this aircraft), and must be changed.

In a same way, the invention would allow detecting fraud (or errors) from batches of secured AC-IDs of replacement parts stored in a warehouse by verifying the authenticity of the markings on the stored parts and checking that the component serial number from the digital security marking matches that marked on the corresponding component. In case of a highly critical component, a tamperproof material-based security marking may further be applied on the component, while the characteristic digital data CDD relating to the corresponding reference unique physical characteristic (for example, as captured by a suitable sensor when applying the material-based security marking) of this marking is preferably made part of the component digital data D in the digital security marking of the aircraft component digital identification document for this component, and a corresponding reference unique physical signature data UPS is calculated (for example, by taking a hash of the characteristic digital data CDD, i.e. UPS=H(CDD)) and may also be part of the component digital data D. This additional level of security improves the security provided by the unique serial number marked on the component by its manufacturer. Preferably, the reference CDD and UPS are stored in the blockchain (to make them immutable) and are accessible to the technician. Moreover, these reference values may also be further stored in the memory of the technician's computer in order to allow offline authentication of the material-based security marking on the highly critical component.

The further offline operation of authentication of this material-based security marking may comprise measuring the unique physical characteristic on the component, by means of a suitable sensor connected to the computer, and obtaining a candidate characteristic digital data $CDD^c$ from the measured characteristic (for example, via a specific application programmed in the CPU of his computer). Then, the technician (or the CPU of his computer, if suitably programmed) compares the obtained $CDD^c$ with the copy of the reference CDD stored in the memory of the computer: in case of "reasonable" matching $CDD^c \approx CDD$ (i.e. within some predefined error tolerance criterion), the material-based security marking, and thus the component, are considered as genuine.

As above mentioned, a copy of the reference physical characteristic digital data CDD, instead of being stored in the memory of the technician's computer, is part of the digital data D included in the digital security marking in the aircraft component digital identification document AC-ID:C of the component C and can be obtained by direct reading on the digital security marking. The technician may then read the candidate $CDD^c$ on the digital security marking and check that the signature UPS stored in the memory of the computer matches the candidate signature $UPS^c$ calculated from the read candidate $CDD^c$ by computing $UPS^c=H(CDD^c)$: in case of matching $UPS^c=UPS$, the material-based security marking, and thus the component and its associated component digital identification document, are confirmed as being genuine.

In a variant of the embodiment, the checking of authenticity of a component digital identification document, and of its associated component, by a technician may alternatively be performed via online process in a similar way as already explained with the first detailed embodiment of the invention, and will not be repeated here.

According to the invention, it is possible to verify the authenticity of an aircraft component digital identification document, AC-ID: $C_{125}$ for example, with respect to the original genuine secured digital file. Indeed, if a technician in charge of control (or repair) operations has access to the digital file AC-ID: $C_{125}$ on its computer (which may also be, for example, a smartphone suitably programmed), he can check that the component digital data correspond to that of the original document by performing the following operations of:

reading the component digital data $D_{125}$ and the verification key $k_{125}$ on the digital security marking 310 of the component digital identification document AC-ID: $C_{125}$;

acquiring a reference batch value B of the batch corresponding to the document AC-ID: $C_{125}$; this reference value may be already in the memory of the computer or may be acquired via a communication link from a database storing the reference batch values of aircraft component digital identification documents in case the computer is equipped with a communication unit, by sending a request containing, for example, the component (unique) serial number or merely the key $k_{125}$ read on the digital security marking 310, and receiving back the corresponding reference batch value B;

calculating (with the programmed one-way function H) a digital file signature $x_{125}$ from the read component digital data $D_{125}$, with $x_{125}=H(D_{125})$;

calculating a candidate batch value (by means of the programmed one-way accumulator and its corresponding operator) $B^c$ with $B^c=k_{125} \otimes_{125}$; and verifying that the candidate batch value $B^c$ matches the reference batch value B.

According to the above detailed description, the invention is clearly compatible with offline and local checking operations for verifying the authenticity of a secured digital file or conformity of data of a copy of a secured digital file with respect to the data content of the original secured digital file. However, the invention is also compatible with online verification process, for example by receiving (via a communication link) a reference batch value form an external source (e.g. server or blockchain), or performing some or all the calculation steps involving the one-way function or the one-way accumulator via external computing means (e.g. operating on a server), or even performing the verification that a candidate aggregated digital signature matches a reference aggregated digital signature (and just receiving the result).

The above disclosed subject matter is to be considered illustrative, and not restrictive, and serves to provide a better understanding of the invention defined by the independent claims.

The invention claimed is:

1. A method of securing a given original digital file of a batch of a plurality of original digital files against forgery or tampering, each original digital file of the batch containing its own digital data, comprising the steps of:

for each original digital file of the batch, calculating by means of a one-way function an associated digital file signature of its digital data;

calculating a reference aggregated digital signature corresponding to the batch of original digital files from all the digital file signatures of the original digital files of the batch by means of a one-way accumulator of said digital file signatures, and making available to a user the reference aggregated digital signature;

determining a digital file verification key corresponding to the digital file signature of said given original digital file by means of a one-way accumulator of all the other digital file signatures used for calculating the reference aggregated digital signature;

calculating a candidate digital file signature by means of the one-way function based on the digital file signature and the verification key;

determining that the candidate digital file signature matches the reference aggregated digital signature when a one-way accumulator of said candidate digital file signature and corresponding digital file verification key corresponds to the reference aggregated digital signature;

when it is determined that the candidate digital file signature matches the reference aggregated digital signature, verifying that the candidate digital file signature corresponds to that of an original digital file of the batch;

including in the given original digital file a digital representation of a machine readable security marking containing a representation of the digital data of the given original digital file and its corresponding digital file verification key; and obtaining a marked original digital file of which digital data are secured against forgery or tampering, wherein the one-way function is a hash function and a digital file signature of an original digital file is a sequence of a given plurality of bits of lower weights selected from the bits of a hash value of the corresponding digital data.

2. The method according to claim 1, wherein the reference aggregated digital signature associated with the batch of original digital files is either published in a media accessible to the user, or stored in a searchable aggregated signature database accessible to the user, or stored in a blockchain, or in a database secured by a blockchain, accessible to the user.

3. The method according to claim 2, wherein the marked original digital file further includes aggregated signature access data containing information to access to the reference aggregated digital signature corresponding to the batch of original digital files, said information being a link to an aggregated signature acquisition interface of, respectively, one of the following:

the media wherein the reference aggregated digital signature is published, the media being accessible to the user via said aggregated signature acquisition interface operable to receive from the user an aggregated signature request containing digital data, or a digital signature of said digital data, obtained from the digital representation of a machine readable security marking of a marked original digital file, and send back a reference aggregated digital signature of associated batch;

the searchable aggregated signature database wherein the reference aggregated digital signature is stored, the aggregated signature database being accessible to the user via said aggregated signature acquisition interface operable to receive from the user an aggregated signature request containing digital data, or a digital signature of said digital data, obtained from the digital representation of a machine readable security marking of a marked original digital file, and send back a reference aggregated digital signature of associated batch;

the blockchain, respectively the database secured by the blockchain, wherein the aggregated digital signature is stored with a time-stamp, the blockchain, respectively the database secured by the blockchain, being accessible to the user via said aggregated signature acquisition interface operable to receive from the user an aggregated signature request containing digital data, or a digital signature of said digital data, obtained from the digital representation of a machine readable security marking of a marked original digital file, and send back a reference aggregated digital signature of associated batch.

4. The method according to claim 1, wherein
a virtual digital file is counted as belonging to the batch of original digital files, said virtual digital file having corresponding virtual digital data, and an associated virtual digital file signature obtained by means of the one-way function of its virtual digital data, said virtual digital file being not real but only used for generating the associated virtual digital file signature from the corresponding virtual digital data; and
the reference aggregated digital signature associated with said batch of original digital files being calculated from all the digital file signatures of the original digital files of the batch, including the virtual digital file signature, by means of the one-way accumulator.

5. The method according to claim 1, wherein
additional digital data corresponding to the digital data associated with the marked original digital file are stored in a searchable information database accessible to the user via an information database interface operable to receive from the user an information request containing digital data, or corresponding digital file signature data, obtained from the digital representation of a machine readable security marking of a marked original digital file, and send back corresponding additional digital data.

6. The method according to claim 1, wherein the digital data of the marked original digital file include reference characteristic digital data CDD of a corresponding unique physical characteristic of an associated object or individual.

7. The method according to claim 1, wherein the calculation of the reference aggregated digital signature is a one-way accumulator function and is performed by the following formula:

$$f(X)=x \bmod m, \text{ and } f(x,y)=x\otimes y, \text{ with } x\otimes y=(x+y)\bmod m; \text{ or}$$

$$f(X)=x \bmod m, \text{ and } f(x,y)=x\otimes y, \text{ with } x\otimes y=x*y \bmod m;$$

where X denotes the digital file signatures of the respective digital data of the original digital files such that $X=(x\_1, x\_2, \ldots, x\_v)$ and m denotes a modulus.

8. A method of verifying the authenticity of a digital file secured according to the method of claim 1, comprising the steps of, upon processing a test file being said digital file or said copy of the digital file by means of a processing unit connected to a memory:
having stored in the memory the test file;
reading the representation of digital data and of a test file verification key on the digital representation of the machine readable security marking in the stored test file, and extracting respectively corresponding digital data and test file verification key from said read representation;
having stored in the memory the reference aggregated digital signature of a corresponding batch of digital files, and having programmed in the processing unit the one-way function and the one-way accumulator;
verifying that the extracted digital data and test file verification key indeed correspond to the stored reference aggregated digital signature by performing the steps of:
calculating a digital signature of the extracted digital data with the one-way function;
calculating a candidate aggregated digital signature from the calculated digital signature of the extracted digital data and the extracted test file verification key with the one-way accumulator; and
checking that the obtained candidate aggregated digital signature matches the stored reference aggregated digital signature, in case said aggregated digital signatures match, the digital data of the test file are that of a genuine original digital file.

9. The method according to claim 8, wherein the digital file is secured by storing the reference aggregated digital signature associated with batch of original digital files in a searchable aggregated signature database, wherein the reference aggregated digital signature associated with the batch of original digital files is either published in a media accessible to the user, or stored in a searchable aggregated signature database accessible to the user, or stored in a blockchain, or in a database secured by a blockchain, accessible to the user, and the processing unit is further connected to a communication unit operable to send and receive back data via a communication link, comprising the preliminary steps of:
sending with the communication unit via the communication link a request to said aggregated signature database, and receiving back the reference aggregated digital signature associated with batch of original digital files; and
storing the received aggregated digital signature in the memory;
wherein the reference aggregated digital signature associated with the batch of original digital files is either published in a media accessible to the user, or stored in a searchable aggregated signature database accessible to the user, or stored in a blockchain, or in a database secured by a blockchain, accessible to the user.

10. The method according to claim 8, wherein the reference aggregated digital signature associated with the batch of original digital files is either published in a media accessible to the user, or stored in a searchable aggregated signature database accessible to the user, or stored in a blockchain, or in a database secured by a blockchain, accessible to the user and
wherein the marked original digital file further includes aggregated signature access data containing information to access to the reference aggregated digital signature corresponding to the batch of original digital files, said information being a link to an aggregated signature acquisition interface of, respectively, one of the following:
the media wherein the reference aggregated digital signature is published, the media being accessible to the user via said aggregated signature acquisition interface operable to receive from the user an aggregated signature request containing digital data, or a digital signature of said digital data, obtained from the digital representation of a machine readable security marking of a marked original digital file, and send back a reference aggregated digital signature of associated batch;
the searchable aggregated signature database wherein the reference aggregated digital signature is stored, the aggregated signature database being accessible to the user via said aggregated signature acquisition interface operable to receive from the user an aggregated signature request containing digital data, or a digital signature of said digital data, obtained from the digital representation of a machine readable security marking of a marked original digital file, and send back a reference aggregated digital signature of associated batch;

the blockchain, respectively the database secured by the blockchain, wherein the aggregated digital signature is stored with a time-stamp, the blockchain, respectively the database secured by the blockchain, being accessible to the user via said aggregated signature acquisition interface operable to receive from the user an aggregated signature request containing digital data, or a digital signature of said digital data, obtained from the digital representation of a machine readable security marking of a marked original digital file, and send back a reference aggregated digital signature of associated batch, and wherein the processing unit is further connected to a communication unit operable to send and receive back data via a communication link, comprising the preliminary steps of:

reading the aggregated signature access data included in the test file;

sending with the communication unit via the communication link an aggregated signature request to said aggregated signature acquisition interface containing the digital data, or a digital signature of said digital data, obtained from the digital representation of a machine readable security marking in the test file, and receiving back a corresponding reference aggregated digital signature of associated batch; and storing the received aggregated digital signature in the memory.

11. The method according to claim 8, wherein additional digital data corresponding to the digital data associated with the marked original digital file are stored in a searchable information database accessible to the user via an information database interface operable to receive from the user an information request containing digital data, or corresponding digital file signature data, obtained from the digital representation of a machine readable security marking of a marked original digital file, and send back corresponding additional digital data, and the processing unit is further connected to communication means operable to send to the information database interface an information request containing digital data, or corresponding digital file signature, obtained from the digital representation of a machine readable security marking in the test file, and receive back corresponding additional digital data.

12. The method according to claim 8, wherein the digital data of the marked original digital file include reference characteristic digital data CDD of a corresponding unique physical characteristic of an associated object or individual, and the processing unit is connected to a sensor operable to detect a unique physical characteristic of an associated object or individual, the processing unit being programmed to extract corresponding unique physical characteristic digital data from a detection signal received from the sensor, the processing unit having stored in the memory reference characteristic digital data CDD corresponding to said unique physical characteristic of the associated object or individual, comprising the further steps of, upon viewing a subject being, respectively, said associated object or individual:

detecting a unique characteristic of the subject and extracting corresponding candidate characteristic digital data $CDD^c$;

comparing the obtained candidate characteristic digital data $CDD^c$ with the stored reference characteristic digital data CDD; and in case the candidate characteristic digital data $CDD^c$ is similar to the stored reference characteristic digital data CDD, within a given tolerance criterion, the subject is considered as genuine.

13. A system for verifying the authenticity of a marked original digital file secured according to the method of claim 1, comprising a processing unit with a memory, the memory storing the reference aggregated digital signature of a corresponding batch of digital files, and the one-way function and the one-way accumulator programmed in the processing unit, operable to:

acquire a test file being said digital file or a copy of the digital file and store the acquired test file in the memory;

read the representation of digital data and of a test file verification key on the digital representation of the machine readable security marking in the stored test file, and extract respectively corresponding digital data and test file verification key from said read representation;

verify that the extracted digital data and test file verification key indeed correspond to the stored reference aggregated digital signature by executing the steps, programmed in the processing unit, of:

calculating the digital signature of the extracted digital data with the one-way function;

calculating the candidate aggregated digital signature from the calculated digital signature of the extracted digital data and the extracted test file verification key with the one-way accumulator; and checking that the obtained candidate aggregated digital signature matches the stored reference aggregated digital signature, in case said aggregated digital signatures match, the digital data of the test file are that of a genuine original digital file and the system is operable to deliver an indication that the digital data on the test file is that of a genuine original digital file.

14. The system according to claim 13, for verifying a digital file, wherein in the method for securing the digital file, the digital data of the marked original digital file include reference characteristic digital data CDD of a corresponding unique physical characteristic of an associated object or individual, or the conformity of a copy of such digital file with respect to the original one, further equipped with a sensor connected to the processing unit and operable to detect a unique physical characteristic of an associated object or individual, and the processing unit is programmed to extract corresponding characteristic digital data from a detection signal received from the sensor, the system having stored in the memory reference characteristic digital data CDD corresponding to said unique physical characteristic of the associated object or individual, the system being further operable to:

detect with the sensor a unique physical characteristic of a subject being said associated object or individual, and extract corresponding candidate characteristic digital data $CDD^c$;

compare the obtained candidate characteristic digital data $CDD^c$ with the stored reference characteristic digital data CDD; and in case the candidate characteristic digital data $CDD^c$ is similar to the stored reference characteristic digital data CDD, within a given tolerance criterion, deliver an indication that the subject is considered as genuine.

* * * * *